(12) United States Patent
Demoulin et al.

(10) Patent No.: US 12,269,971 B2
(45) Date of Patent: Apr. 8, 2025

(54) UV-CURABLE ACRYLIC COPOLYMERS

(71) Applicant: HENKEL AG & CO. KGAA, Duesseldorf (DE)

(72) Inventors: Olivier Demoulin, Grez-Doiceau (BE); Jurgen Van Holen, Ninove (BE); Marc Van Muylder, Geraardsbergen (BE)

(73) Assignee: HENKEL AG & CO. KGaA, Duesseldorf (DE)

( * ) Notice: Subject to any disclaimer, the term of this patent is extended or adjusted under 35 U.S.C. 154(b) by 187 days.

(21) Appl. No.: 15/382,839

(22) Filed: Dec. 19, 2016

(65) Prior Publication Data

US 2017/0096588 A1    Apr. 6, 2017

Related U.S. Application Data

(63) Continuation of application No. PCT/EP2015/062194, filed on Jun. 2, 2015.

(30) Foreign Application Priority Data

Jun. 24, 2014   (EP) .................................... 14173603

(51) Int. Cl.
| | | |
|---|---|---|
| *C09J 151/00* | (2006.01) | |
| *B05D 3/06* | (2006.01) | |
| *C08F 8/14* | (2006.01) | |
| *C08F 220/18* | (2006.01) | |
| *C08F 265/06* | (2006.01) | |
| *C09D 4/06* | (2006.01) | |
| *C09J 4/06* | (2006.01) | |
| *C09J 7/22* | (2018.01) | |
| *C09J 7/38* | (2018.01) | |
| *C09J 133/06* | (2006.01) | |
| *C09J 133/08* | (2006.01) | |

(52) U.S. Cl.
CPC .......... *C09J 151/003* (2013.01); *B05D 3/067* (2013.01); *C08F 8/14* (2013.01); *C08F 220/1808* (2020.02); *C08F 265/06* (2013.01); *C09D 4/06* (2013.01); *C09J 4/06* (2013.01); *C09J 7/22* (2018.01); *C09J 7/38* (2018.01); *C09J 7/385* (2018.01); *C09J 133/068* (2013.01); *C09J 133/08* (2013.01); *C08F 220/1804* (2020.02); *C09J 2301/162* (2020.08); *C09J 2301/302* (2020.08); *C09J 2301/416* (2020.08); *C09J 2451/00* (2013.01)

(58) Field of Classification Search
CPC . C09J 151/003; C09J 7/385; C09J 7/22; C09J 7/38; C09J 4/06; C09J 133/068; C09J 133/08; C09J 2201/162; C09J 2201/606; C09J 2205/31; C09J 2451/00; B05D 3/067; C08F 8/14; C08F 220/18; C08F 265/06; C08F 2220/1858; C08F 20/10; C08F 220/325; C08F 220/1808; C08F 220/1802; C08F 220/14; C08F 220/06; C08F 220/1804; C08F 220/1801; C09D 4/06

See application file for complete search history.

(56) References Cited

U.S. PATENT DOCUMENTS

| | | | |
|---|---|---|---|
| 5,095,065 A * | 3/1992 | Yang ...................... | C08F 289/00 |
| | | | 524/458 |
| 5,543,546 A * | 8/1996 | Tsuneki ............... | B01J 19/1862 |
| | | | 558/270 |
| 6,610,762 B1 | 8/2003 | Webster | |
| 2001/0051702 A1* | 12/2001 | Slark ........................ | C08F 8/14 |
| | | | 526/328.5 |
| 2008/0108721 A1* | 5/2008 | Ha ......................... | C09J 133/02 |
| | | | 522/33 |
| 2009/0093584 A1 | 4/2009 | Gelles et al. | |
| 2010/0221585 A1* | 9/2010 | Terashima .............. | H01M 2/14 |
| | | | 429/8 |

(Continued)

FOREIGN PATENT DOCUMENTS

| | | |
|---|---|---|
| CN | 1910247 A | 2/2007 |
| CN | 101821332 A | 9/2010 |

(Continued)

OTHER PUBLICATIONS

English translation of WO2010/146883.*

*Primary Examiner* — Robert S Walters, Jr.
(74) *Attorney, Agent, or Firm* — Sun Hee Lehmann

(57) ABSTRACT

The present invention provides the methods for producing a UV-curable acrylic copolymer. The method includes polymerizing a mixture of monomers comprising (i) 40-95 wt % of at a (meth) acrylate monomer, (ii) 5-60 wt % of a copolymerizable monomer, wherein the copolymerizable monomer is selected from those whose homopolymers have a glass transition temperature of higher than −30° C., and (iii) optionally 0.5-20 wt % of a copolymerizable functional monomer having a functional group selected from the group consisting of a hydroxyl group and a carboxyl group to form an acrylic copolymer. The method includes reacting the acrylic copolymer with at least one type of monomer comprising a UV-curable functional group in the presence of a catalyst to form the UV-curable acrylic copolymer. Also encompassed are UV-curable acrylic copolymers thus formed, adhesive composition comprising the UV-curable acrylic copolymers, methods for manufacturing adhesive sheets comprising the UV-curable acrylic copolymers, and use of the UV-curable acrylic copolymers.

4 Claims, No Drawings

(56) References Cited

U.S. PATENT DOCUMENTS

2012/0094119 A1* 4/2012 Fujita .................... C08F 265/06
522/111

FOREIGN PATENT DOCUMENTS

| | | | |
|---|---|---|---|
| CN | 102952503 A | 3/2013 | |
| JP | 53-126091 A | 11/1978 | |
| JP | 61-64772 A | 4/1986 | |
| JP | 2001519444 A | 10/2001 | |
| JP | 2002-114830 A | 4/2002 | |
| WO | 9918136 A1 | 4/1999 | |
| WO | WO-2010146883 A1 * | 12/2010 | ........... C07D 209/82 |
| WO | WO-2012080215 A1 * | 6/2012 | ................ C08F 2/46 |

* cited by examiner

UV-CURABLE ACRYLIC COPOLYMERS

FIELD OF THE INVENTION

The present invention relates to UV-curable acrylic copolymers as well as methods for their manufacture. The invention also relates to adhesive composition comprising the UV-curable acrylic copolymers, methods for manufacturing adhesive sheets comprising the UV-curable acrylic copolymers, and use of the UV-curable acrylic copolymers.

Pressure sensitive adhesive ("PSA") refers generally to a type of adhesive which is at room temperature in essentially dry form (solvent and/or water free) aggressively and/or permanently tacky. It adheres firmly to a variety of dissimilar surfaces upon mere contact without the need of more than finger or hand pressure, heat and chemical activation. In use, one or more layers of PSA are applied to a substrate or backing to form adhesive tapes or adhesive sheets.

BACKGROUND OF THE INVENTION

Typical pressure sensitive adhesive formulations are acrylic-based, and may include copolymers of alkyl ester monomers, a functional monomer such as acrylic acid, and may be cross-linked using, for example, aluminum or titanium chelates as catalysts. These adhesives may be further tackified to improve adhesion on different types of substrates. However, this is usually accompanied by impairments in resistance to degradation and aging for most graphics and industrial tape applications in which acrylic solutions are conventionally used.

State of the art methods to manufacture pressure sensitive adhesive formulations involve use of solvents. Driven by pressure from legislation, there is need for high performance pressure sensitive adhesives which are solvent-free. Furthermore, it is desirous to coat thick tapes in a single pass to reduce waste as well as to increase productivity.

In view of the above, there exists a need for improved UV-curable acrylic copolymers and methods for their manufacture, as well as adhesive compositions including the improved UV-curable acrylic copolymers, that address one or more of the above-mentioned problems.

SUMMARY OF THE INVENTION

The present invention meets this need by providing a UV-curable acrylic copolymer that exhibits good adhesive performance while being essentially solvent-free and a method for the preparation thereof.

In a first aspect, the present invention thus relates to a method for the production of a UV-curable acrylic copolymer. The method comprises:
(a) polymerizing a mixture of monomers to form an acrylic copolymer, the monomer mixture comprising:
  (i) 40-95 wt % of at least one (meth)acrylate monomer,
  (ii) 5-60 wt % of at least one copolymerizable monomer, wherein said monomer is selected from those whose homopolymers have a glass transition temperature of higher than −30° C., and
  (iii) optionally 0.5-20 wt % of at least one copolymerizable functional monomer having a functional group selected from the group consisting of a hydroxyl group and a carboxyl group; and
(b) reacting the acrylic copolymer with at least one type of monomer comprising a UV-curable functional group in the presence of a catalyst to form the UV-curable acrylic copolymer.

The above percentages relate to the total monomer mixture, i.e. are wt.-% relative to the total weight of the monomer mixture.

In a second aspect, the present invention relates to UV-curable acrylic copolymer obtainable according to a method of the first aspect.

In a third aspect, the present invention relates to adhesive composition, preferably pressure sensitive adhesive (PSA) or hotmelt composition, comprising a UV-curable acrylic copolymer of the second aspect and a photoinitiator.

In a fourth aspect, the present invention relates to a method of preparing an adhesive sheet. The method includes:
  i) coating the adhesive composition according to the third aspect on a substrate to form a layer of said adhesive composition on the substrate surface; and
  ii) irradiating the layer of the adhesive composition with UV light to form the adhesive sheet.

In a fifth aspect, the invention relates to the use of a UV-curable acrylic copolymer according to the first aspect as an adhesive, preferably a pressure sensitive adhesive or hotmelt.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more.

"About", as used herein, relates to ±20%, preferably ±10% of the numerical value to which it refers. "About 200" thus relates to 200±40, preferably 200±20.

Advantageously, UV-curable acrylic copolymers disclosed herein may be used for manufacture of high performance adhesive sheets. It has been demonstrated herein that the performance of the adhesive sheets is significantly higher compared to state of the art ultraviolet pressure sensitive adhesives such as AcResin®. Ultraviolet light is used to cure the UV-curable acrylic copolymers to manufacture adhesive sheets, and drying stations used in conventional manufacturing methods are not required. By employing methods disclosed herein, thick adhesive tapes may be manufactured using a single coating/curing pass, which is an improvement compared to state of the art manufacturing methods where multiple passes are used. The single coating/curing pass translates into productivity improvements, lower energy requirements for production, and reduced waste generation, all of which translates into cost savings. Furthermore, solvent or carbon dioxide emission is substantially reduced. In some instances, negligible or almost zero levels of solvent and/or carbon dioxide generation have been achieved.

DETAILED DESCRIPTION OF THE INVENTION

In a first aspect, the invention refers to a method for the production of a UV-curable copolymer. The method includes as a first step polymerizing a mixture of monomers to yield an acrylic copolymer, the mixture comprising:
(i) 40-95 wt % of at least one (meth)acrylate monomer,
(ii) 5-60 wt % of at least one copolymerizable monomer, wherein said monomer is selected from those whose homopolymers have a glass transition temperature of higher than −30° C., and
(iii) optionally 0.5-20 wt % of at least one copolymerizable functional monomer having a functional group selected from the group consisting of a hydroxyl group and a carboxyl group.

The amount of the at least one (meth)acrylate monomer in the mixture of acrylic monomers is in the range of about 40 wt % to about 95 wt %. In preferred embodiments, the at least one (meth)acrylate monomer in the mixture of acrylic monomers is at least about 45 wt %, such as at least about 50 wt %, about 55 wt %, about 60 wt %, about 65 wt %, about 70 wt %, about 75 wt %, about 80 wt %, about 85 wt %, about 90 wt %, or about 94.5 wt %. In further preferred embodiments, the at least one (meth)acrylate monomer in the mixture of acrylic monomers is less than or equal to about 94 wt %, such as less than or equal to about 90 wt %, about 85 wt %, about 80 wt %, about 75 wt %, about 70 wt %, about 65 wt %, about 60 wt %, about 55 wt %, about 50 wt %, or about 45 wt %. In more preferred embodiments, the at least one (meth)acrylate monomer in the mixture of acrylic monomers is in the range of about 45 wt % to about 94 wt %, such as about 45 wt % to about 80 wt %, about 45 wt % to about 70 wt %, about 50 wt % to about 94 wt %, about 45 wt % to about 80 wt %, or about 50 wt % to about 70 wt %. In more preferred embodiments, the mixture of monomers may comprise at least about 45 wt %, preferably at least about 50 wt % of the at least one (meth)acrylate monomer; and/or less than or equal to 94 wt %, preferably less than or equal to 80 wt %, more preferably less than or equal to 70 wt % of the at least one (meth)acrylate monomer. All given amounts relate to the total weight of the monomer mixture.

In preferred embodiments, the at least one (meth)acrylate monomer is selected from those whose homopolymers have a glass transition temperature of lower than or equal to about −30° C., such as less than or equal to about −40° C., less than or equal to about −50° C. or less than or equal to about −60° C.

The Tg may be determined according known methods. It may for example be determined according to ASTM E 1356-08 with the measurement being conducted on a DSC823e instrument of Mettler at a heating rate of 10° C./min. The DSC is purged with nitrogen gas at a flow rate of 50 ml/min and the sample mass is 10 mg. The Tg is estimated from a heat-flow-temperature thermogram as the inflection or midpoint of the transition.

The at least one (meth)acrylate monomer may be an alkyl(meth)acrylate. Preferably, the number of carbon atoms in the alkyl group of the alkyl(meth)acrylate is in the range of 3 to 20, such as 5 to 20, 10 to 20, 15 to 20, 3 to 15, 3 to 10, 3 to 5, 5 to 8, 6 to 10, or 8 to 15. For example, the alkyl(meth)acrylate may be selected from the group consisting of butyl acrylate, iso-octyl acrylate, 2-ethyl hexyl acrylate, and mixtures thereof. In more preferred embodiments, the alkyl(meth)acrylate is 2-ethyl hexyl acrylate.

The at least one copolymerizable monomer in the mixture of acrylic monomers is present in the range of about 5 wt % to about 60 wt %. In preferred embodiments, the mixture of acrylic monomers comprises at least about 10 wt %, such as at least about 15 wt %, about 20 wt %, about 25 wt %, about 30 wt %, about 35 wt %, about 40 wt %, about 45 wt %, about 50 wt %, or about 55 wt % of the at least one copolymerizable monomer. In preferred embodiments, the mixture of acrylic monomers comprises at least about 10 wt %, preferably at least about 20 wt % of the at least one copolymerizable monomer. In preferred embodiments, the at least one copolymerizable monomer in the mixture of acrylic monomers is less than or equal to about 59.5 wt %, such as less than or equal to about 59 wt %, about 55 wt %, about 50 wt %, about 45 wt %, about 40 wt %, about 35 wt %, about 30 wt %, about 25 wt %, about 20 wt %, about 15 wt %, or about 10 wt %. In more preferred embodiments, the at least one copolymerizable monomer in the mixture of monomers is in the range of about 10 wt % to about 59 wt %, such as about 10 wt % to about 50 wt %, about 10 wt % to about 40 wt %, about 20 wt % to about 59 wt %, about 20 wt % to about 50 wt %, or about 20 wt % to about 40 wt %. In most preferred embodiments, the at least one copolymerizable monomer may be comprised in the mixture of monomers in an amount of at least about 10 wt %, preferably at least about 20 wt %; and/or less than or equal to 59 wt %, preferably less than or equal to 50 wt %, more preferably less than or equal to 40 wt %. All given amounts relate to the total weight of the monomer mixture.

In various embodiments, the at least one copolymerizable monomer is selected from the group consisting of alkyl (meth)acrylates, vinyl acetate, styrene, and mixtures thereof. Preferably, the number of carbon atoms in the alkyl group of the alkyl(meth)acrylate is in the range of 1 to 20, such as 5 to 20, 10 to 20, 15 to 20, 1 to 15, 1 to 10, 1 to 5, 5 to 8, 6 to 10, or 8 to 15. In some embodiments, the alkyl(meth) acrylate is selected from the group consisting of methyl (meth)acrylate, ethyl(meth)acrylate, tert-butyl(meth)acrylate, and mixtures thereof.

The at least one copolymerizable functional monomer may be present or absent, i.e. it is an optional component in the mixture of monomers. When present, the amount of the at least one copolymerizable functional monomer in the mixture of monomers is in the range of about 0.5 wt % to about 20 wt %. In preferred embodiments, the at least one copolymerizable functional monomer in the mixture may be at least about 1 wt %, such as at least about 1.5 wt %, about 2 wt %, about 2.5 wt %, about 5 wt %, about 7 wt %, about 10 wt %, about 12 wt %, about 15 wt %, or about 18 wt %. For example, the mixture of acrylic monomers may comprise at least about 1 wt %, preferably at least about 1.5 wt % of the at least one copolymerization functional monomer. In further preferred embodiments, the at least one copolymerizable functional monomer in the mixture of acrylic monomers is less than or equal to about 20 wt %, such as less than about 18 wt %, about 15 wt %, about 12 wt %, about 10 wt %, about 7 wt %, about 6 wt %, about 5 wt %, about 4 wt %, about 3 wt %, or about 2 wt %. For example, the mixture of acrylic monomers may comprise less than or equal to 10 wt %, preferably less than or equal to 7 wt % of the at least one copolymerizable functional monomer. In further preferred embodiments, the at least one copolymerizable functional monomer in the mixture of acrylic monomers is in the range of about 1 wt % to about 10 wt %, such as about 1 wt % to about 7 wt %, about 1.5 wt % to about 10 wt %, or about 1.5 wt % to about 7 wt %. In certain embodiments, the mixture of monomers may optionally comprise at least about 1 wt %, preferably at least about 1.5 wt % of the at least one copolymerizable functional monomer; and/or less than or equal to 10 wt %, preferably less than or equal to 7 wt % of the at least one copolymerizable functional monomer. All given amounts relate to the total weight of the monomer mixture.

In preferred embodiments, the at least one copolymerizable functional monomer is selected from the group consisting of a hydroxyalkyl(meth)acrylate, ethoxylated and/or propoxylated derivatives of hydroxyalkyl(meth)acrylate, adducts thereof with lactones, (meth)acrylic acid, β-carboxyethyl(meth)acrylate, crotonic acid, maleic acid, fumaric acid, itaconic acid, acrylic acid, methacrylic acid, hydroxyethyl acrylate, and mixtures thereof.

Preferably, the number of carbon atoms in the alkyl group of the hydroxyalkyl(meth)acrylate is in the range of 1 to 20, such as 5 to 20, 10 to 20, 15 to 20, 1 to 15, 1 to 10, 1 to 5, 5 to 8, 6 to 10, or 8 to 15. In more preferred embodiments, the hydroxyalkyl(meth)acrylate is selected from the group consisting of hydroxyethyl(meth)acrylate, hydroxypropyl (meth)acrylate, hydroxybutyl(meth)acrylate, hydroxypentyl (meth)acrylate, hydroxyheptyl(meth)acrylate, hydroxynonyl (meth)acrylate, hydroxydecyl(meth)acrylate, isomers thereof, ethoxylated and/or propoxylated derivatives thereof, adducts thereof with lactones; diethylene glycol mono(meth)acrylate, polyethylene glycol mono(meth)acrylate, propylene glycol mono(meth)acrylate, polypropylene glycol mono(meth)acrylate, and mixtures thereof.

In most preferred embodiments, the mixture of monomers is a mixture of acrylic monomers. It may, for example, comprise or consist of 2-ethyl hexylacrylate, methacrylic acid, methyl acrylate and ethyl acrylate. In alternative most preferred embodiments, the mixture of acrylic monomers comprises or consists of butylacrylate, methacrylic acid, methyl acrylate and ethyl acrylate.

The mixture of acrylic monomers may be polymerized by free radical polymerization to form an acrylic copolymer. Exemplary polymerization initiators include organic azo or peroxo compounds. Suitable polymerization initiators are widely known in the art and readily available. Exemplary compounds are diisobutyrylperoxide, cumolperoxyneodecanoate, 1,1,3,3-tetramethylbutyl peroxyneodecanoate, tertiary amylperoxyneodecanoate, di-(4-tertiary butylcyclohexyl)peroxydicarbonate, di-(2-ethylhexyl) peroxydicarbonate, dibenzoylperoxide, tertiary butylperoxy-2-ethylhexanoate, tertiary butylperoxyisobutyrate, 1,1-di-(tertiary butylperoxy)-3,3,5-trimethylcyclohexane, 1,1-di-(tertiary butylperoxy)cyclohexane, tertiary amylperoxy-2-ethylhexylcarbonate, tertiary butylperoxy-3,5,5-trimethylhexanoate, 2,2-di-(tertiary butylperoxy)butane, tertiary butylperoxyneodecanoate, di-n-butylperoxydicarbonate, dicetylperoxydicarbonate, dimyristylperoxydicarbonate, tertiary amylperoxypivalate, tertiary butylperoxypivalate, di-(3,5,5-trimethylhexanoyl) peroxide, tertiary butylperoxyisopropyl-carbonate, tertiary butylperoxy-2-ethylhexylcarbonate, tertiary butylperoxyacetate, tertiary butylperoxybenzoate, di-tertiary amylperoxide, dicumylperoxide, tertiary butylcumylperoxide, dilauroylperoxide, didecanoylperoxide, 2,2'-azobisisobutyronitrile, 2,2'-azodi-(2-methylbutyronitrile), 2,5-dimethyl-2,5-di(2 ethyl hexanoylperoxy)hexane, 1,1,3,3-tetramethylbutylperoxy-2-ethylhexanoate, tertiary amylperoxy-2-ethylhexanoate, 2,5-dimethyl-2,5-di(tertiary butylperoxy)hexyn-3, di-isopropylbenzene mono hydroperoxide, cumolhydroperoxide, 1,1,3,3-tetramethylbutyl hydroperoxide, and tertiary butylhydroperoxide. In preferred embodiments, the polymerization initiator comprises or consists of 2,2'-azobisisobutyronitrile (AZDN).

The method according to the invention further comprises the second step of reacting the acrylic copolymer with at least one type of monomer comprising a UV-curable functional group in the presence of a catalyst to form the UV-curable acrylic copolymer.

In preferred embodiments, the monomers comprising a UV-curable group are monomers that comprise a vinyl and an epoxy group, are preferably epoxy-functionalized (meth) acrylates, more preferably glycidyl esters of (meth)acrylic acid. Further examples include, but are not limited to, glycidyl methacrylate, glycidyl acrylate, acryloyl chloride, methacryloyl chloride, methacrylic acid, acrylic acid, and mixtures thereof. In more preferred embodiments, the monomer comprising a UV-curable group is glycidyl methacrylate.

The compositions according to the present invention can optionally comprise a chain transfer agent. In this regard, thiols and halomethanes which are known to the skilled person can be used. Preferably, dodecylmercaptane is comprised in the composition. In a more preferred embodiment the composition contains the transfer agent from 0.1 to 1 wt.-%, most preferred 0.3 to 0.7 wt.-%, based on the total weight of the acrylic monomers.

The compositions according to the present invention can further optionally comprise an inhibitor for stabilizing acrylic groups. Exemplary compounds are 4-methoxyphenol (MEHQ) and phenothiazine. In preferred embodiments, MEHQ is comprised. In more preferred embodiments the inhibitor is comprised in an amount of 1 to 1000 ppm, most preferred 200 to 700 ppm, based on the total weight of the composition.

Polyaddition/Polymerization may take place via a polycondensation reaction in the presence of a catalyst. As used herein, the term "polycondensation" refers to the formation of polymeric compounds via a chemical reaction between components (monomers). It is typically accompanied by elimination of small molecules, i.e., compounds having a molecular weight of less than about 800 g/mol, such as water and carbon dioxide. Examples of catalyst that may be used include, but are not limited to, metal acetylacetonates and/or their hydrates, such as zinc acetylacetonate, copper (II) acetylacetonate, chromium acetylacetonate, sodium acetylacetonate, cobalt acetylacetonate, iron acetylacetonate, and mixtures thereof. In more preferred embodiments, the catalyst comprises or consists of zinc acetylacetonate hydrate.

In preferred embodiments, the method further comprise the step of providing the mixture of acrylic monomers in a suitable solvent and evaporating the solvent prior to reacting the acrylic copolymer with the at least one type of monomer comprising a UV-curable group, wherein the residual solvent content in the acrylic copolymer after evaporating the solvent is preferably less than 1 wt %.

Different solvents may be used depending on the type of monomers present. Examples of suitable solvents include, but are not limited to, ethyl acetate, propyl acetate, butyl acetate, isopropanol, glycol ethers, alkyl lactates, and mixtures thereof. In preferred embodiments, the solvent comprises or consists of ethyl acetate.

The solvent may be removed by applying heat and/or vacuum to the mixture. Different heating temperatures and/or vacuum settings may be suitable depending for example, on the solvent used and are known to the skilled person. The term "vacuum" is defined as the state of gas, wherein the pressure and thus the particle density within a container (e.g., flask) is lower than in the surrounding atmosphere outside the container or if the pressure of the gas is lower than 300 mbar. The heating temperature is chosen to be below a temperature where the composition would undergo any chemical alteration, e.g., decomposition or further reaction. In preferred embodiments, the solvent is evaporated such that residual solvent content in the mixture of acrylic copolymers is less than 1 wt %, such as less than 0.9 wt %, 0.8 wt %, 0.7 wt %, 0.6 wt %, 0.5 wt %, 0.4 wt %, 0.3 wt %, 0.2 wt %, or 0.1 wt %.

The glass transition temperature of the acrylic copolymer is preferably below room temperature. In preferred embodiments, it is in the range of about −60° C. to about 20° C., such as about −50° C. to about 20° C., about −30° C. to about 20° C., about −10° C. to about 20° C., about 0° C. to about 20° C., about −60° C. to about 10° C., about −60° C. to about 0° C., about −60° C. to about −10° C., about −60° C. to about −30° C., about −60° C. to about −40° C., or about −30° C.

to about 0° C. In more preferred embodiments, the glass transition temperature of the acrylic copolymer is in the range of about −30° C. to about 10° C. In most preferred embodiments, the range is 0° C. to 10° C.

The monomers comprising a UV-curable group may be used in a concentration that yields a UV-curable acrylic copolymer with a concentration of the UV-curable function on the polymer in the range of about 1 mol % to about 2.5 mol %, such as about 1 mol % to about 2 mol %, about 1 mol % to about 1.5 mol %, about 1.25 mol % to about 2.5 mol %, about 1.5 mol % to about 2.5 mol %, about 1.75 mol % to about 2.5 mol %, or about 2 mol % to about 2.5 mol % relative to the number of repeating units in the polymer. In more preferred embodiments, concentration of UV-curable function on the UV-curable acrylic copolymer is about 1.25 mol % to about 1.75 mol % relative to the number of repeating units in the polymer.

In a second aspect, the invention relates to a UV-curable acrylic copolymer obtainable according to the method of the first aspect. In a further aspect, the invention relates to an adhesive composition, preferably pressure sensitive adhesive (PSA) or hotmelt composition, comprising the UV-curable acrylic copolymer of the second aspect and a photoinitiator.

Examples of photoinitiator that may be used include, but are not limited to, benzophenone, methyl-2-benzoylbenzoate, 2-hydroxy-2-methyl-1-phenyl-1-propanone, 1-hydroxy-cyclohexyl-phenyl-ketone, mixture of mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester, ethyl-2,4,6-trimethylbenzoylphenyl phosphinate, and diphenyl (2,4,6-trimethylbenzoyl)-phosphine oxide, and mixtures thereof. In more preferred embodiments, the photoinitiator comprises or consists of diphenyl (2,4,6-trimethylbenzoyl)-phosphine oxide.

In a yet further aspect, the invention relates to a method of preparing an adhesive sheet. The method includes coating the adhesive composition of the second aspect onto a substrate to form a layer of said adhesive composition on the substrate surface; and irradiating the layer of the adhesive composition with UV light to form the adhesive sheet.

In preferred embodiments, the coating step is carried out at a temperature less than about 140° C., such as less than about 120° C., 110° C., 100° C., or 90° C. In more preferred embodiments, the mixture of UV-curable acrylic copolymers is coated on the substrate at a temperature in the range of about 100° C. to about 120° C.

The layer of UV-curable acrylic copolymers is irradiated with ultraviolet light to form the adhesive sheet. In preferred embodiments, a photoinitiator is present. Upon irradiation with ultraviolet light, the UV-curable acrylic copolymer is cured to form the adhesive sheet.

In a further aspect, the invention relates to the use of a UV-curable acrylic copolymer according to the second aspect in the manufacture of an adhesive. Preferably, the adhesive is a pressure sensitive adhesive or hotmelt.

Thus prepared adhesive or adhesive sheets formed thereof have potential applications for example in high performance adhesives or functional coatings. As compared with solvent-based pressure sensitive adhesives, adhesives or adhesive sheets disclosed herein are advantageous in that no thermal drying is required, thereby translating into improvements in productivity as drying time is eliminated. Furthermore, solvent-based acrylic products according to the state of the art may only be coated for up to 40 to 50 g/m$^2$. This may lead to ineffective drying. This further means that multi-pass processes are needed to form thicker layers, which may result in increase in material wastage and loss of productivity. This limitation is not present in the methods disclosed herein.

In the following, the invention is described in greater detail by reference to a concrete embodiment, namely UV-curable acrylic copolymers formed from 2-ethyl hexylacrylate, methacrylic acid, methyl acrylate and ethyl acrylate; or butylacrylate, methacrylic acid, methyl acrylate and ethyl acrylate. It is however understood that the present invention is not limited to such embodiments, but can easily be adapted to use other monomers, catalysts, solvents, and photoinitiators. Such alternative embodiments are also encompassed by the scope of the instant invention.

EXAMPLES

Examples 1 and 2

Synthesis of the UV-Curable Acrylic Copolymer

An acrylic copolymer was made by a 4 hour full monomer delay process in 720 parts of ethylacetate by copolymerizing 660 parts of 2-ethylhexylacrylate, 120 parts of methacrylic acid, 258 parts of methylacrylate and 400 parts of ethylacrylate. In parallel, 4.77 parts AZDN initiator (VAZO 64) and 10.8 parts of dodecylmercaptane (chain transfer agent) were added. After addition, the mixture was kept for 2 h at reflux temperature to assure full conversion. Residual monomer concentration was below 1% as measured by Gas Chromatography.

A second acrylic copolymer was obtained by using a different monomer mixture in a similar method. The compositions of said mixtures are shown in Table 1.

|  | Composition 1 (mass %) | Composition 2 (mass %) |
| --- | --- | --- |
| AZDN initiator | 0.33 | 0.33 |
| N-dodecylmercaptan | 0.75 | 0.75 |
| 2-Ethylhexylacrylate | 45.88 | — |
| Butylacrylate | — | 45.88 |
| Methacrylic acid | 8.36 | 8.36 |
| Methylacrylate | 17.98 | 17.98 |
| Ethylacrylate | 27.77 | 27.77 |

In a second step the ethyl acetate was removed from the mixture by using a combination of heating and vacuum. The residual solvent content, as measured by gas chromatography, was below 1 wt.-%.

In a third step, glycidyl methacrylate (1.5 mol %) was added to the acrylic copolymer together with 1000 ppm of MEHQ inhibitor and 1000 ppm zinc acetyl acetonate hydrate catalyst. The reaction was monitored by titrating the residual epoxy functions and was considered complete when the conversion was more than 90%.

In a fourth step, the UV-curable copolymer was formulated with 2% diphenyl(2,4,6-trimethylbenzoyl)phosphineoxide (TPO) as a photoinitiator.

The fully formulated hotmelt was then coated and cured as described below. The final product was characterized by cohesion and adhesion measurements.

Cohesion and adhesion measurements of the formulated UV-curable acrylic copolymers.

Prepared in example 1.

The adhesive properties were tested for their adhesion, tack and cohesion by the methods described below.

Test Sample Preparation:

All tapes for the PSA results herein are made by adhesive transfer. The uncured, liquid PSA composition is drawn down on release paper (Loparex Poly Slik 111/120, Apeldoorn, The Netherlands, roll No. WO3180672). Drawdowns are made at 100° C. using a Gardco Automatic Drawdown Machine, 30 cm stroke, on the slowest speed (about 1.5 m/min), using a Braive Instruments adjustable Bird applicator, typically at 25 to 130 µm setting. The composition is UV cured on a conveyer belt having a variable speed with a UV-Fusion lamp BF9 (H-bulb) having a power of 200 watts/cm, the speed depending on the thickness of the adhesive. The output of the lamp is tested by measuring UV-A, B and C dose and irradiance at the correct belt speed by using a puck.

|   | mJ/cm$^2$ | mW/cm$^2$ |
|---|---|---|
| A | 873 | 1982 |
| B | 921 | 2105 |
| C | 156 | 361 |

The cooled film is laminated with a 50 µm thick white PVC film for composition 1 and a 50 µM thick PET film for composition 2 using two double passes of a 2 kg hard rubber roller. The laminate is cut into strips of 2.5 cm by approximately 17.5 cm.

All room temperature performance testing is conducted in a constant temperature/constant humidity controlled room held at 23+2° C., 50+5% relative humidity.

Peel Testing

The tapes prepared as described here above can be applied on test panels made out of stainless steel (SST), glass and other materials. Peel tests are conducted 20 minutes after application according to EN 1939 on an Instron machine. Results are reported in N per 25 mm.

Shear Resistance

The shear resistance is a measure of the cohesiveness or internal strength of an adhesive. It is based upon the amount of force required to pull an adhesive strip from a standard flat surface in a direction parallel to the surface to which it has been affixed with a definite pressure. It is measured in terms of time required to pull a standard area of adhesive coated sheet material from a stainless steel test panel under a constant load.

The tests are conducted on tapes applied to a stainless steel panel such that a 6.25 mm by 6.25 mm portion of each tape is in firm contact with the panel with one end portion of the tape being free. The panel with tape attached is held in a rack so that the panel forms an angle of 178 degree relative to the rack. A 1 kg weight is attached on the extended tape free end. The test can be done at different temperatures. Results are reported below.

SAFT Testing

The SAFT is also a measure of the cohesiveness or internal strength of an adhesive. This test is a modification of the shear test, also described for example in ASTM D-4498-95, using an identical construction but here it is placed in an oven which is heated at a constant rate. The test was done starting at room temperature with a heating rate of 1° C. per minute. The temperature at which the weight falls is recorded. If the weight still hangs at 210° C. then the test is stopped and this value is noted.

Loop Tack Testing

This test method is intended to determine the tack properties of a pressure sensitive adhesive. This test method is applicable to those adhesives that form a bond of measurable strength rapidly upon contact with another surface. These methods involve allowing a loop of pressure sensitive adhesive with its backing to be brought into contact with a surface of stainless steel, with the only force applied being the weight of the pressure sensitive article itself. The pressure sensitive article is then removed from the substrate, with the force to remove the pressure sensitive article from the adherend measured by a recording instrument. Loop tack tests are conducted 20 minutes after application according to Finat test method no. 9 on an Instron machine. Results are reported in N per 25 mm.

| Products | Units | Composition 1 | Composition 2 |
|---|---|---|---|
| Coatweight | g/m$^2$ | 30 | 65 |
| Shear 70° C., 1 kg/inch$^2$ | min | >10000 | >10000 |
| SAFT, 1 kg/inch$^2$ | ° C. | 210 | 210 |
| Peel 180° Steel 1 minute | N/25 mm | — | 22.9 |
| Peel 180° Steel 20 minutes | N/25 mm | — | 19.6 |
| Peel 180° Steel 24 h | N/25 mm | — | 27.3 |
| Loop tack on Steel | N/25 mm | — | 22.7 |
| Peel 180° Glass 1 minute | N/25 mm | 12.6 | — |
| Peel 180° Glass 20 minutes | N/25 mm | 17.6 | — |
| Peel 180° Glass 24 h | N/25 mm | 16.5 | — |
| Loop tack on Glass | N/25 mm | 18.7 | — |

The peel and loop tack measurements are repeated after the adhesive with composition 1 has been stored for 1 and 2 weeks on release liner in an oven at 70° C.

| Products | Units | Composition 1 |
|---|---|---|
| Construction aged for 7 days at 70° C. | | |
| Peel 180° Glass 20 minutes | N/25 mm | 15.0 |
| Peel 180° Glass 24 h | N/25 mm | 14.0 |
| Loop tack on Glass | N/25 mm | 19.7 |
| Construction aged for 14 days at 70° C. | | |
| Peel 180° Glass 20 minutes | N/25 mm | 15.3 |
| Peel 180° Glass 24 h | N/25 mm | 14.6 |
| Loop tack on Glass | N/25 mm | 17.0 |

The invention claimed is:

1. A method for producing a pressure sensitive adhesive, the method comprising:
    (A) polymerizing a mixture, based on the total weight of the mixture, of:
        (i) 40-75 wt. % of 2-ethyl hexylacrylate and/or butyl acrylate,
        (ii) 5 to about 10 wt. % of methacrylic acid, and
        (iii) about 20 to about 55 wt. % of methyl acrylate and/or ethyl acrylate,
    in a solvent selected from the group consisting of ethyl acetate, propyl acetate, butyl acetate, isopropanol, glycol ethers, alkyl lactates, and any mixture thereof, and in the presence of a free radical agent, to form a composition comprising an acrylic copolymer and the solvent;
    (B) reducing the solvent content within the composition such that the residual solvent content is less than 1 wt. %, based on the total weight of the composition;
    (C) reacting the acrylic copolymer with a monomer having a UV-curable functional group, which comprises a vinyl and an epoxy group in the presence of a chain transfer catalyst, thereby forming a UV-curable acrylic copolymer having a glass transition temperature of about 0° C. to about 10° C.;
(D) adding a photoinitiator to the UV-curable acrylic copolymer; and
(E) irradiating the UV-curable acrylic copolymer with ultraviolet light to form the pressure sensitive adhesive, wherein the pressure sensitive adhesive remains permanently tacky.

2. The method according to claim 1, wherein the monomer having a UV-curable functional group is glycidyl methacrylate and/or glycidyl acrylate.

3. The method of claim 1, wherein the pressure sensitive adhesive exhibits a shear resistance of greater than 10,000 minutes.

4. A method for producing a pressure sensitive adhesive having a dry coat weight of 30 to 65 g/m$^2$, the method comprising:
(A) polymerizing a mixture, based on the total weight of the mixture, of:
(i) 40-75 wt. % of 2-ethyl hexylacrylate and/or butyl acrylate,
(ii) 5 to about 10 wt. % of methacrylic acid, and
(iii) about 20 to about 55 wt. % of methyl acrylate and/or ethyl acrylate,
in a solvent that is ethyl acetate, and in the presence of a free radical agent that is 2,2'-azobisisobutyronitrile, to form a composition comprising an acrylic copolymer and the solvent;
(B) reducing the solvent content within the composition such that the residual solvent content is less than 1 wt. %, based on the total weight of the composition;
(C) reacting the acrylic copolymer with a monomer that is glycidyl methacrylate in the presence of a chain transfer catalyst that is N-dodecylmercaptan, thereby forming a UV-curable acrylic copolymer having a glass transition temperature of about 0° C. to about 10° C.;
(D) adding a photoinitiator that is diphenyl (2,4,6-trimethylbenzoyl)phospineoxide (TPO) to the UV-curable acrylic copolymer; and
(E) irradiating the UV-curable acrylic copolymer with ultraviolet light to form the pressure sensitive adhesive, wherein the pressure sensitive adhesive remains permanently tacky, and
wherein the pressure sensitive adhesive exhibits a shear resistance of greater than 10,000 minutes.

* * * * *